Jan. 7, 1958 T. S. NOSKOWICZ 2,819,427
LIGHT SOURCE
Filed April 14, 1955
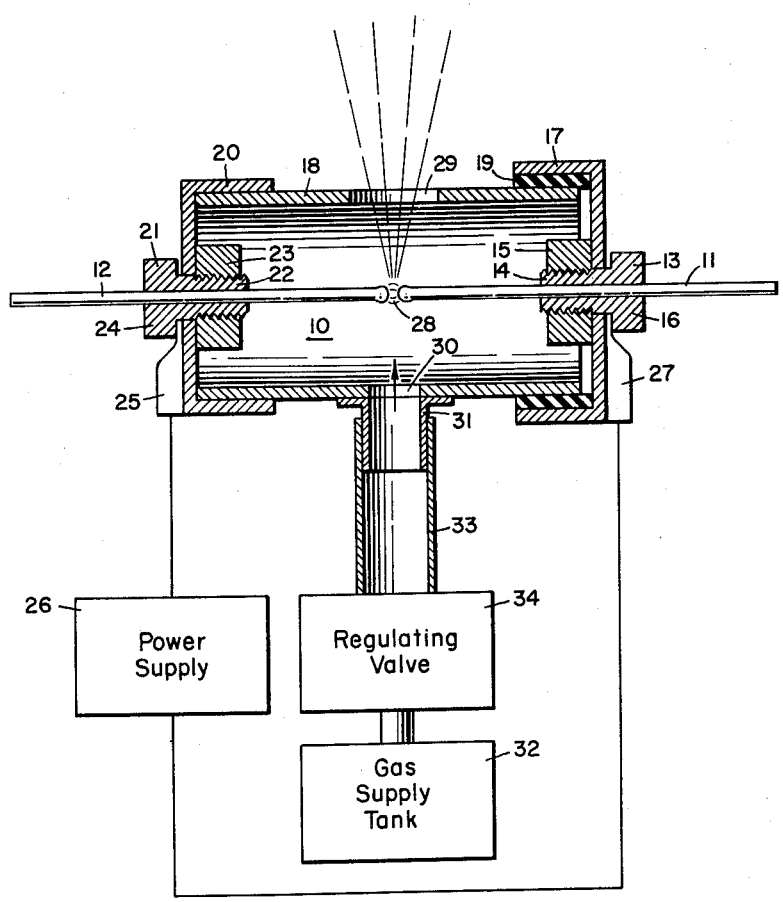
THEODORE S. NOSKOWICZ
INVENTOR.
BY John J. Pederson
HIS ATTORNEY.

United States Patent Office 2,819,427
Patented Jan. 7, 1958

2,819,427
LIGHT SOURCE

Theodore S. Noskowicz, Wooddale, Ill., assignor to The Rauland Corporation, a corporation of Illinois Application April 14, 1955, Serial No. 501,391

1 Claim. (Cl. 315—111)

This invention is directed to a new and improved limited-area light source particularly suited for use in photographic processes.

There are a number of photographic processes which can be most effectively carried out by means of a light source of extremely limited area; in many of these processes, the apparent source of light should approach a single point in size. Moreover, in many of these same photographic methods, enhanced results may be obtained and processing time may be reduced if the light source employed emits light of relatively great intensity, particularly in the actinic range. A typical example of a process of this type is employed in the manufacture of color television image reproducers, in which a photo-sensitive layer is applied to the internal screen surface of the image reproducer envelope and is exposed through a master pattern constituting or representative of the color-selection electrode of the tube. Speed of exposure in this process is quite important, since it is a principal factor in determining the cost of the finished tube. In addition, accuracy in the exposure pattern is of utmost importance, since any discrepancies in that pattern may seriously impair color fidelity in an image reproduced by the finished tube. In most processes employed for this purpose, the effective source of the light utilized to expose the photo-sensitive screen layer must be small enough in area to approximate a single point if an accurate pattern is to be achieved. In addition, any optical elements which might cause refraction or other distortion of the light from the exposure source may create highly undesirable irregularities in the exposure pattern.

It is a principal object of the invention, therefore, to provide a new and improved limited-area light source of extreme intensity in the actinic range.

It is another object of the invention to provide a new and improved photographic light source which permits ready adjustment of the light intensity and which also provides for control of the effective source area.

It is a further object of the invention to provide a new and improved limited-area light source in which there are no optical elements interposed in the path of the emitted light.

It is a corollary object of the invention to provide a new and improved limited-area photographic light source which is relatively simple and expedient to construct and operate.

A limited-area photographic light source constructed in accordance with the invention comprises a pair of electrodes and means for supporting those two electrodes in spaced relationship with respect to each other to establish an arc discharge space therebetween. A shield structure substantially encompasses the two electrodes and is provided with an exposure aperture adjacent the discharge space. Means are provided for coupling the electrodes to a source of electrical current to establish an arc discharge through the discharge space and additional means are employed to continuously flow an inert gas through that space.

The features of the invention which are believed to be novel are set forth with particularity in the appended claims. The organization and manner of operation of the invention, together with further objects and advantages thereof, may best be understood by reference to the following description taken in conjunction with the accompanying drawing, the single figure of which is a cross-sectional view, partly schematic, of a photographic light source constructed in accordance with the invention.

The apparatus illustrated in the drawing comprises a light source 10 including a pair of discharge electrodes 11 and 12. In the illustrated embodiment, electrodes 11 and 12 comprise rods preferably formed from tungsten or similar conductive material having a high melting point. Electrode 11 is supported within a ferrule 13 having a threaded extension 14 engaged by a retaining nut 15. Ferrule 13 is preferably provided with an enlarged flange portion 16 and may be formed from any suitable conductive material such as brass, iron, etc.

Ferrule 13 is supported within a shield cap 17 which may comprise a substantially cup-shaped member formed from stainless steel or other suitable material. Cap 17 is mounted on a shield tube 18 with an electrically insulating sleeve 19 interposed between the cap and the tube. Shield tube 18 may be formed from stainless steel or other suitable metal or may comprise a section of ceramic tubing, in which case insulator sleeve 19 may be eliminated. A second shield cap 20 is mounted on the end of tube 18 opposite cap 17 and may be similar in construction to cap 17. Cap 20 may be mounted directly on the shield tube or may be spaced therefrom by an insulating sleeve such as member 19 if desired.

A second support ferrule 21 is mounted on cap 20; ferrule 21 may be essentially similar in construction to member 13 and may include a threaded extension 22 engaged by a retaining nut 23. Ferrule 21 is also provided with an enlarged flange section 24. Flange section 24 is employed to maintain mechanical and electrical contact between the ferrule and a connector 25 which is connected to a source of electrical current, power supply 26. The similar flange section 16 of ferrule 13 clamps an electrical connector 27 which is also connected to power supply 26. Consequently, electrodes 11 and 12 are effectively coupled to power supply 26 through the two supporting ferrules.

The ends of electrodes 11 and 12 disposed within shield tube 18 are spaced from each other by a relatively small distance to establish an arc discharge space 28 between the two electrodes. Shield tube 18 has an exposure aperture 29 adjacent discharge space 28 to permit unobstructed emission of light therefrom. The shield tube is also provided with a second aperture 30 preferably disposed directly opposite aperture 29; a conduit fitting 31 is mounted on shield tube 18 in juxtaposition with aperture 30 and coupled to a gas supply tank 32 by means of a conduit 33 and a regulating valve 34. Supply tank 32 may comprise a conventional bottle or tank filled with an inert gas, such as helium or argon, under pressure.

When the light source illustrated in the drawing is placed in operation, electrodes 11 and 12 are energized from power supply 26 and an arc discharge is established through space 28. At the same time, a flow of inert gas from supply tank 32 is initiated; during operation, the gas is continuously flowed through conduit 33 and through discharge space 28. The volume and velocity of the gas flow is controlled by regulating valve 34 to maintain the gas supply rate constant and prevent disturbance of the arc discharge. The gas escapes from shield tube 18 through aperture 29.

When light source 10 is first placed in operation, it is usually desirable to allow a warm-up period before using the light for precision work, since the space between electrodes 11 and 12 may change somewhat as the light source heats up during operation. The effective size of the source of light may be readily controlled by adjusting the spacing between electrodes 11 and 12; the effective size of the illumination source may also be varied by using electrodes of different diameter. At the same time, the intensity of the light can be easily controlled by adjustment of the arc current supplied from power supply 26. In this connection, it should be noted that the arc discharge, once initiated, appears as a negative resistance in the electrical circuit; consequently, it is necessary to employ a current-limiting power supply. Electrical power sources of this type are quite common and are subject to wide variation in construction; because the construction of this particular portion of the system is not critical, no specific apparatus is described.

Light emanating from the arc discharge in space 28 is emitted through aperture 29 without optical obstruction; consequently, the light appears to radiate with equal intensity in all directions within the geometric arc subtended by aperture 29 from a very small area and is very well suited for many photographic purposes. Furthermore, actinic light created by the arc discharge is generally concentrated at the center of space 28; as a result, the effective area of the source of light is somewhat smaller than the space between rods 11 and 12.

For photographic purposes for which a point source of light is desired, rods 11 and 12 are preferably separated by a distance of approximately 0.1 inch or less. Relatively low pressures may be employed for the inert gas flowed through discharge space 28; for example, excellent results have been achieved with gas pressures of approximately two to three pounds per square inch gauge. A typical operating current for source 10 may be of the order of 45 amperes, although a substantial range of currents may be employed, depending upon the intensity of light desired and the cross-sectional areas of electrodes 11 and 12.

Light source 10 is extremely simple in construction and requires no special manufacturing techniques. Electrodes 11 and 12 last for indefinite periods of time, provided an adequate flow of the inert gas from tank 32 is initiated before the arc is established in space 28. There are no refractive elements in the optical path of light from the source, and the effective size of the source of light may be made small enough to constitute an effective point source. Moreover, device 10 provides much more intense light than any conventional source of comparable size.

While a particular embodiment of the present invention has been shown and described, it is apparent that changes and modifications may be made without departing from the invention in its broader aspects. The aim of the appended claims, therefore, is to cover all such changes and modifications as fall within the true spirit and scope of the invention.

I claim:

A limited-area photographic light source comprising: a pair of rod-shaped electrodes; means for supporting said electrodes on a common axis in spaced relationship with respect to each other to establish an arc discharge space therebetween; an opaque shield structure substantially encompassing said electrodes, said shield structure having a restricted-area exposure aperture disposed on an axis passing through said discharge space at right angles to said common axis and communicating with the ambient atmosphere; means for energizing said electrodes to establish an uninterrupted arc discharge through said discharge space; and means, including a gas inlet adjacent said discharge space opposite said exposure aperture and a source of inert gas maintained at a pressure only a small fraction of an atmosphere above normal atmospheric pressure and coupled to said gas inlet, for continuously flowing said inert gas through said discharge space at a low velocity without disrupting said arc discharge.

References Cited in the file of this patent

UNITED STATES PATENTS

| | | |
|---|---|---|
| 246,517 | Keith | Aug. 30, 1881 |
| 1,173,562 | Ditcham | Feb. 29, 1916 |
| 1,216,647 | Armor | Feb. 20, 1917 |

FOREIGN PATENTS

| | | |
|---|---|---|
| 126,161 | Australia | Dec. 3, 1947 |